J. PERCY.
Traction-Wheel.
No. 15,815. Patented Sept. 30, 1856
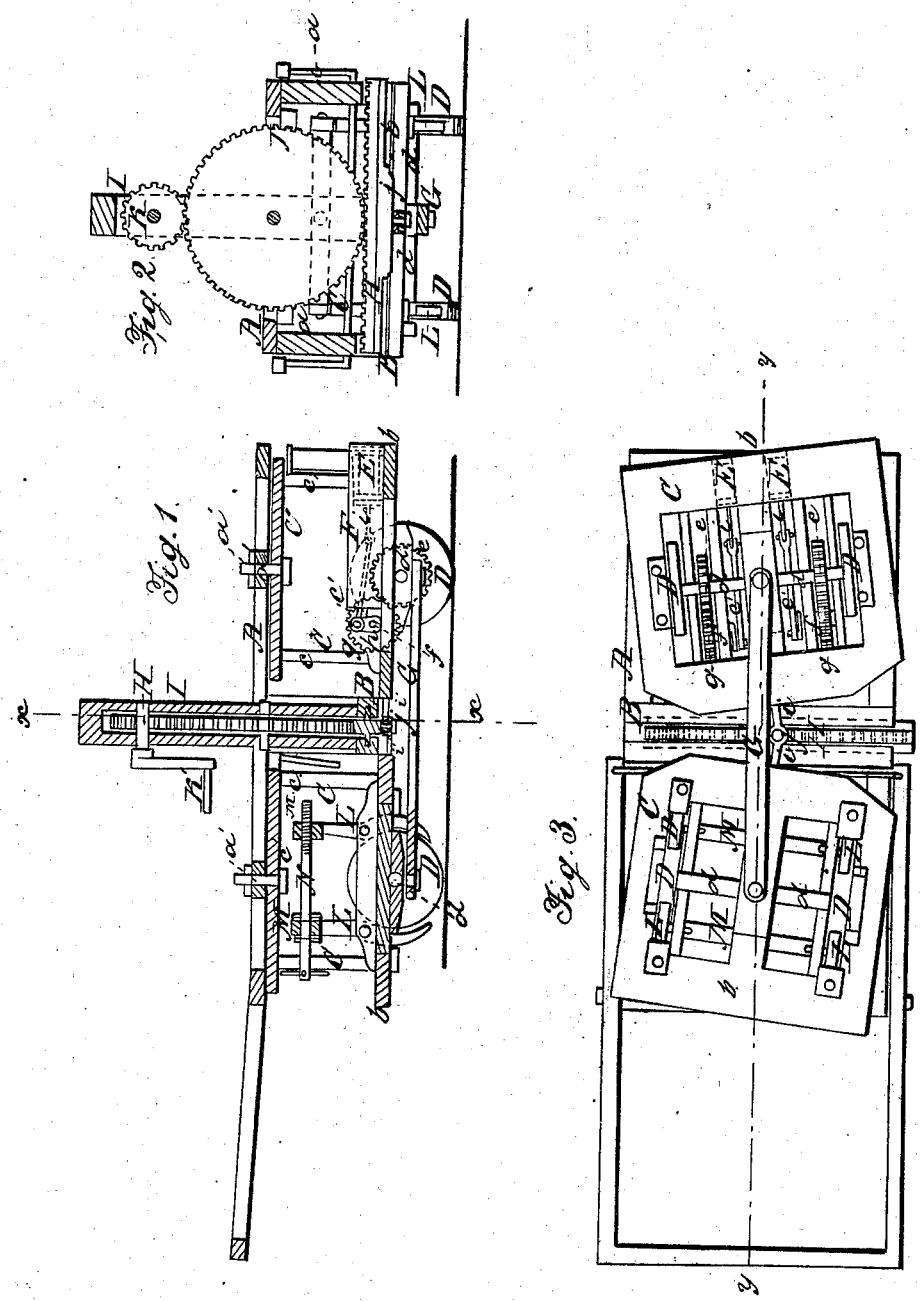

UNITED STATES PATENT OFFICE.

JNO. PERCY, OF ALBANY, NEW YORK.

STEAM-WAGON.

Specification of Letters Patent No. 15,815, dated September 30, 1856.

*To all whom it may concern:*

Be it known that I, JOHN PERCY, of the city and county of Albany, and State of New York, have invented a new Improved Locomotive or Steam-Wagon for Traveling on Common Roads and for Connecting Plows Thereto for Plowing by Steam; and I do hereby declare that the following is a full, clear, and exact description of the same, reference being had to the annexed drawings, making a part of this specification, in which—

Figure 1, is a longitudinal vertical section of my improvement; the plane of section being through the center, as indicated by the line $y, y$, Fig. 3. Fig. 2, is a transverse vertical section of ditto; $x, x$, Fig. 1, showing the plane of section. Fig. 3, is a plan or top view of ditto.

Similar letters of reference indicate corresponding parts in the several figures.

To enable those skilled in the art to fully understand and construct my invention, I will proceed to describe it.

A, represents a horizontal rectangular frame to the center of each side piece of which a pendent $a$, is attached, the lower ends of said pendents being connected by a cross piece B.

C, C, represent two trucks which are connected by bolts $a^1$, to the underside of the frame A, one truck being at the front and the other at the back part of the frame. These trucks are each formed of a horizontal rectangular frame $b$, having uprights $c$, attached to it, and circular disks $c^1$, attached to the upper ends of the uprights. The bolts $a^1$, passing through the centers of the disks. The space between the frames $b$ of the trucks and the frame A and disks $c^1$, is sufficiently high to allow a man to stand upright on the frames $b$. Each truck is allowed to turn freely on its bolt $a^1$.

Each truck is provided with two wheels D, D, one at each side. The wheels have each a separate or independent axle $d$, and each axle has a toothed wheel $e$, upon it. In the frames $b$, and directly opposite and parallel with each axle $d$, a shaft $f$, is placed. These shafts have pinions $g$, upon them, which pinions gear into the wheels $e$. The inner ends of the shafts $f$, have cranks $h$, upon them, said cranks being attached to connecting rods $e$, which are attached to piston rods $i$, which work in steam cylinders E, placed on the frames $b$, one at each side of a boiler F. There is a boiler on each truck frame $b$, and two cylinders E, although in the drawing one truck only is provided with them.

The two trucks C, C, are connected by a perch G, the ends of which are pivoted to the under sides of the frames $b$, at their centers.

H, is a rack which is fitted and works in the cross piece B. This rack has two rods $i^1$, secured to its under side by a bolt or pivot $j$, which is a common center for the two rods. The outer ends of the rods are fitted loosely in the inner ends of the truck frames $b$.

To the center of the upper surface of the cross piece B, there is attached a vertical bar I, which is slotted vertically and has a toothed wheel J, fitted within it. This toothed wheel gears into the rack H. A pinion K, gears into the wheel J, the shaft of said pinion having a crank $K^1$, at its end. This brake is formed by having the shoes L, pivoted to the frames $b$, as shown clearly in Fig. 1. The upper ends of the shoes being connected by parallel bars, M, through which a screw N, passes. By turning this screw the shoes may be pressed upon and relieved from the wheels.

By the above improvement it will be seen that the two trucks C, C, may, by turning the crank $K^1$, be turned so as to allow the machine to turn within a small space; and without deranging the driving apparatus, the machine may also pass over uneven ground and the driving machinery kept in line. The engines, brakes, and all the parts may be attended with but little labor.

Having thus described my invention, what I claim as new, and desire to secure by Letters Patent, is,

1. The two trucks C, C, attached to the under side of the frame A, connected by the perch G and turned by means of the rods $i, i^1$, which are fitted in the inner ends of the frames $b$, of said trucks and connected to the rack H, or an equivalent device.

2. I claim connecting the axles $d$ of the wheels D, with the connecting rods $e^1$, of the steam cylinders by means of the gearing $e$, $g$, and cranks $h$; substantially as described.

3. I claim the arrangement of the trucks C, C, frame A, steam cylinders E, boilers F, and the device for turning and guiding the trucks; as herein shown and described for the purpose set forth.

JOHN PERCY.

Witnesses:
A. J. MILTON,
JOHN COSTIGAN.